Dec. 12, 1961   E. H. McCLEASE   3,012,536
IRRIGATION SIGNAL
Filed Dec. 17, 1958
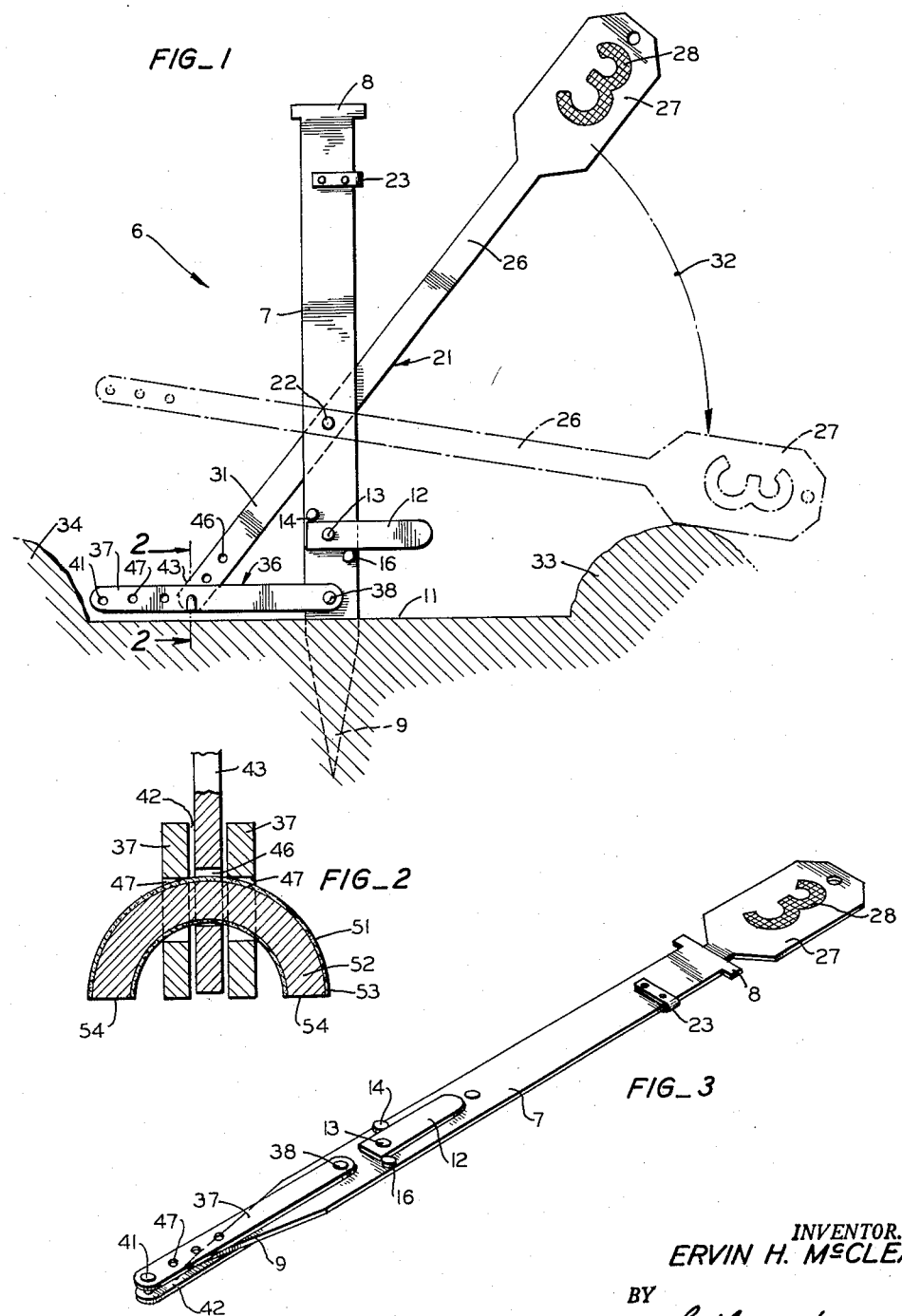
INVENTOR.
ERVIN H. McCLEASE
BY
Lothrop & West
ATTORNEYS

United States Patent Office 3,012,536
Patented Dec. 12, 1961

3,012,536
IRRIGATION SIGNAL
Ervin H. McClease, Rte. 2, Box 387, Stockton, Calif.
Filed Dec. 17, 1958, Ser. No. 781,010
2 Claims. (Cl. 116—118)

The invention relates to indicating devices responsive to external stimuli and, more particularly, to devices which provide, for example, a signal when acted upon by predetermined fluids, such as water in an irrigation furrow or other water course.

One of the major problems in nearly all types of irrigation is that of determining when the water from the head ditch has reached the remote end of the various rows or furrows. A number of devices purporting to solve this problem have been suggested but they have in most instances been cumbersome to carry and their complexity has made their cost prohibitive.

It is therefore an object of the invention to provide an irrigation signal which is not only convenient to transport but is also relatively economical to build and has but few parts to get out of order.

It is another object of the invention to provide a signal device which is flexible in operation.

It is a further object of the invention to provide an irrigation signal which enables the user to determine from a considerable distance, even under adverse conditions of light and weather, whether the water has reached the far end of a row.

It is another object of the invention to provide a generally improved irrigation signal.

Other objects, together with the foregoing, are attained in the embodiment described in the following description and shown in the accompanying drawing, in which:

FIGURE 1 is a front elevation showing the device in a typical environment, namely, in an idealized version of an irrigation ditch, shown in transverse section;

FIGURE 2 is a section, to an enlarged scale, of one form of locking tablet in signal arm holding position, the plane of section being indicated by the line 2—2 in FIGURE 1; and FIGURE 3 is a perspective of the device in folded position.

The device of the invention, generally designated by the numeral 6, includes a standard 7, or support member preferably of flat or strap stock for convenience in carrying and handling. The upper end of the standard is widened to form a driving head 8 enabling the user to drive the point 9 of the standard into the furrow bottom 11 a sufficient distance to hold the standard in rigid vertical attitude.

The device will ordinarily be located at the end of the furrow remote from the head ditch with the device facing toward the head ditch so that it would appear to an observer located on the head ditch as it appears in FIGURE 1.

Supplementing the convenience provided by the driving head 8 in forcing the standard into the ground is a foot bar 12 pivotally mounted on the standard, as by a rivet 13, or bolt, the fastening being tight enough so as to require some effort to swing the foot bar 12 from the open position shown in FIGURE 1 to the closed position appearing in FIGURE 3. An upper limit stop pin 14 and a lower limit stop pin 16 secured to the standard 7 serve to stop and support the foot bar 12 both in open position (see FIGURE 1) and in closed position (see FIGURE 3). The tight fit of the bar to the standard maintains the bar in the closed or folded position for transportation shown in FIGURE 3 when urged into that position by the user preparatory to carrying or storing the device.

Signalling is effected by a signal arm or signaling member, generally designated by the numeral 21, the arm being pivotally mounted, adjacent a generally central location, on the standard 7, so as to swing freely about a pin 22. A spring clip 23 or latch mounted near the upper end of the standard serves to locate and confine the signal arm 21 in general registry with the standard (see FIGURE 3) when folded for transport purposes.

The signal arm 21 includes an upper portion 26 surmounted conveniently by an enlarged indicator head or flag portion 27 to which is attachable an indicia 28, such as a number, to indicate the particular row in which the device is located. The indicia, conveniently, is detachable from the device and may be of reflective material for conditions of poor visibility.

The upper portion 26 of the signal arm 21 is heavier than and thus overbalances a lower portion 31 located on the other side of the pivot pin 22. Consequently, when the arm 21 is initially placed in the inclined position shown in full line in FIGURE 1, the heavier portion 26 tends to swing the signal arm in the direction indicated by the arrow 32 and toward the position indicated in dotted line in FIGURE 1 wherein the head or plate 27 impinges against the right-hand bank 33 of the furrow, there also being a corresponding left-hand bank 34 cooperating with the bank 33 to confine and direct the water in the furrow.

Serving to hold the signal arm in its proper initial position is a positioning element, generally designated by the numeral 36, including a pair of spaced, parallel straps 37 pivotally mounted, as by a rivet 38, on the standard 7. As with the foot bar 12, the fitting is rather tight so that when swung to transport or folded position, as in FIGURE 3, the straps 37 may overlie the sharp point 9 and do not become dislodged from this protective position even though subjected to considerable jostling.

Each of the straps 37 originates on an opposite side of the standard and the straps are secured at their distal end by a suitable fastening 41, thus defining between them a vertical elongated slot 42 within which the lower distal end 43 of the signal arm portion 31 is inserted. In this connection it is to be noted that the lower portion 31 of the signal arm is flexible enough to be bent slightly so as to permit insertion of the tip end 43 into the slot 42 without any tendency, whatsover, to bind. The same result may be had by loosely fitting the pivot 22.

A plurality of apertures 46 adjacent the lower end of the signal arm and a plurality of pairs of registering openings 47 in the straps adjacent the distal end thereof permit a wide variation of relative placements for the straps 37 and the signal arm in order to align the various apertures and openings.

In the particular arrangement shown in FIGURE 1, the straps 37 and the signal arm 21 are so disposed that the lowest one of the apertures 46 is in registry with the innermost pair of strap openings 47.

Serving to maintain the signal arm in its "cocked" or set attitude, shown in full line in FIGURE 1, is a locking element 51, or tablet, or pin traversing the mutually aligned strap openings 47 and the signal arm aperture 46.

For ordinary use, the tablet 51 comprises a material which is readily soluble in water (for example, material such as the material comprising "aspirin" or "Alka-Seltzer" tablets).

Where rain or high humidity is in prospect the readily water soluble mass, designated by the numeral 52 is shielded by a coating 53 or wrapping capable of resisting rain or moisture but capable of being sheared by the weight of the signal arm when the water in the furrow reaches the tablet and dissolves the mass 52. The tablet in this instance is curved downwardly at opposite ends, as shown in FIGURE 1, to shed any rain, dew or fog but is open at both ends 54 so as to be vulnerable to attack by the water arriving via the furrow.

Upon dissolution of the tablet as the water reaches the device at the end of the furrow, the signal arm swings downwardly to the position shown in outline in FIGURE 1, thus indicating remotely that no further water need be directed down this furrow.

The straps 37 are valuable not only as signal arm positioners and as protective covers for the sharp point 9 but they also serve to depress any weeds or grasses or other growth which might be present in the furrow. In other words, when the standard has been driven into the ground and the straps are swung from an upwardly inclined attitude down to the substantially horizontal attitude shown, a swath or path of grass is pushed down and held down by the straps. As a consequence, the signal arm is provided with a cleared path, free from interference with weeds, etc., as it comes time for the signal arm to swing into signal or tripped position, i.e. the position shown in outline in FIGURE 1.

The device of the invention is not only admirably suited for an irrigation indicator but it can also be adapted to other uses and environments. For example, the tablet can be made of material soluble in oils, acids, bases, etc. to indicate terminal flow of these compounds.

It can therefore be seen that I have provided a farm implement which is not only highly reliable and economical but which is extremely flexible in its uses.

It may be desirable to alter or remodel this device in order to adapt it to variable conditions of weather, soil and crops, and such modifications are deemed to be within the scope of the invention, it being clearly understood that the purposes and scope of the invention are limited only by the appended claims.

What is claimed is:
1. An irrigation signal comprising a vertical standard flattened at its upper end and sharpened at its lower end, a positioning element pivotally mounted adjacent the lower end of said standard, said positioning element including a pair of spaced parallel straps having a plurality of pairs of registering openings adjacent the distal end thereof, a signal arm pivotally mounted adjacent the central portion of said standard, one end of said signal arm being enlarged to receive indicia and the other end of said signal arm being movable into a position between said straps and being provided with a plurality of apertures each adapted to register with a predetermined pair of registering openings in said straps, and a water soluble element disposable in and extendable across said predetermined pair of registering openings in said straps and through a predetermined one of said apertures in said signal arm.

2. A signal device responsive to the presence of water in a furrow, said device comprising a vertically supportable standard, a signal arm having its generally central portion pivotally mounted on said standard, the weight of one portion of said signal arm measured from the pivot axis exceeding the weight of the other portion thereof, the distal end of said other portion having an aperture formed therein, a positioning element mounted on said standard and extending laterally therefrom, said positioning element being provided with an opening adapted to register with said aperture in said other portion of said signal arm, and a water soluble solid member disposed in said opening and said aperture in registering position thereof.

References Cited in the file of this patent
UNITED STATES PATENTS

| | | |
|---|---|---|
| 1,123,819 | Twibell | Jan. 5, 1915 |
| 1,876,478 | Van Duzer | Sept. 6, 1932 |
| 2,572,937 | Lawson | Oct. 30, 1951 |
| 2,584,425 | Cox | Feb. 5, 1952 |
| 2,591,037 | Adam | Apr. 1, 1952 |
| 2,740,371 | Nelson | Apr. 3, 1956 |
| 2,911,939 | Marks | Nov. 10, 1959 |